June 11, 1963  L. PERILSTEIN  3,092,877
REINFORCED FRAME MEMBER OF ELASTOMERIC MATERIAL
Filed Jan. 27, 1961  2 Sheets-Sheet 1

INVENTOR.
Louis Perilstein
BY Fred C. Matheny
ATTORNEY

June 11, 1963 — L. PERILSTEIN — 3,092,877
REINFORCED FRAME MEMBER OF ELASTOMERIC MATERIAL
Filed Jan. 27, 1961 — 2 Sheets-Sheet 2

INVENTOR
Louis Perilstein
BY Fred C. Matheny
ATTORNEY

United States Patent Office 3,092,877
Patented June 11, 1963

3,092,877
REINFORCED FRAME MEMBER OF
ELASTOMERIC MATERIAL
Louis Perilstein, 2416 24th Ave. N., Seattle, Wash.
Filed Jan. 27, 1961, Ser. No. 85,391
3 Claims. (Cl. 20—56.4)

My invention relates to a reinforced frame member of elastomeric material which has the elastic and deformable characteristics of rubber and which may be "neoprene."

An object of my invention is to provide, in strip form, elastomeric material which has rigid reinforcing permanently embodied therein, said reinforcing rendering the elastomeric strip fairly strong and resistant to bending and making it suitable for use as a frame for flat sheets or panes or panels of glass and other material.

Another object is to provide a reinforced elastomeric frame member in which the elastomeric material is extruded or molded and the reinforcing is inserted later and becomes part of the frame member.

It is common practice to provide sealing strips of elastomeric material for use between a frame which is part of a rigid structure, such as a building or a motor vehicle body, and a panel of glass or other material which is to be supported within said frame. These sealing strips are necessarily flexible and are not, in themselves, capable of functioning as frames but must derive their support from the rigid structure in which they are installed. It is an object of this invention to render these sealing strips fairly stiff and strong and resistant to bending and to make them capable of functioning as true frames and strengthening and protecting the panels to which they are applied while at the same time retaining their deformable sealing characteristics.

Another object is to provide an elastomeric frame member having therein at least one longitudinally extending glass-receiving groove, one side of which is formed by an inwardly extending flap and said frame member having within the glass-receiving groove a reinforcing member of L-shaped cross section, one flange of the reinforcing member being disposed under the flap and the other flange thereof resting on the bottom of the glass receiving groove.

Another object is to provide an elastomeric frame strip having therein at least one longitudinally extending glass-receiving groove and having one flat side positioned in transversely offset relation to said glass receiving groove, and having a T-shaped groove extending from said flat side inwardly, said T-shaped groove having therein a rigid reinforcing member which fills the T-shaped groove and has a flange covering the flat side of said elastomeric frame strip.

Other objects of my invention will be apparent from the following description taken in connection with the accompanying drawings. Also where the term glass-receiving groove is used herein it will be understood to refer to grooves capable of receiving and fitting over flat plates of glass or other materials.

In the drawings FIGURE 1 is a cross sectional view of an elastomeric strip or frame member made in accordance with my invention showing the same with the reinforcing member and spline or filler strip removed.

Like reference numerals refer to like parts throughout the several views.

Figure 1:
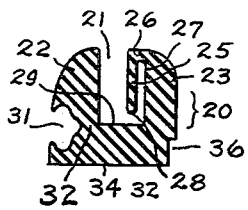

The frame member shown in FIG. 1 is in the form of a strip 20 of elastomeric material of generally square cross sectional shape having a longitudinally extending glass-receiving groove 21 in one side thereof. The sides of said groove 21 are formed by two wing parts 22 and 23 between which an edge portion of a non-flexible panel, such as a pane of glass 24 is received. The wing part 23 at one side of the groove 21 has an inwardly extending flap 25 which forms one wall of said groove 21. The outer edge of the flap 25 is integrally connected by a hinge portion 26 with the wing part 23. The inner side of said flap 25 is spaced from the adjacent wall 27 of the wing part 23 and the inner edge 28 of said flap 25 is spaced from the bottom wall 29 of the groove 21.

A rigid reinforcing bar 30 of L or angle shaped cross section is incorporated into and forms a permanent part of the elastomeric frame strip 20. One flange of said bar 30 is embedded under the flap 25 and the other flange of said bar 30 rests on the bottom 29 of the groove 21. A longitudinally extending spline-receiving groove 31 is provided in the frame member 20 in offset relation to the groove 21 and substantially at the base of the wing part 22 leaving said wing part 22 connected with the strip 20 by a fairly thin hinge portion 32 which makes it possible to incline the part 22 outwardly and facilitate insertion of the reinforcing bar 30 and glass 24. A filler strip or spline 33 of elastomeric material is provided for insertion into and removal from the groove 31 and serves to sealingly wedge the wing part 22 against the glass 24 when said spline is in the groove 31. Obviously this also sealingly presses the glass 24 against the flap 25 of the reinforced wing part 23.

The frame strip 20 has a flat side 34 which is adapted to rest on or against a suitable support, such as a window sill cover 35. The strip 20 can be provided with a notch 36 to receive a stop 37 on the window sill cover 35.

The reinforced elastomeric strip 20 functions as a true frame member which is resistant to bending in all directions and which protects and lends strength to the glass 24 and minimizes breakage and makes the glass easier to handle.

Figure 2:
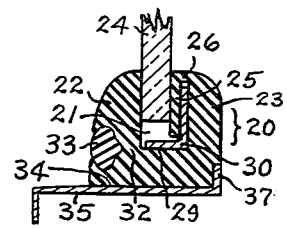
FIG. 2 is a cross sectional view of said strip showing the same resting on a window sill cover and with a reinforcing member and a spline or filler strip and a fragment of a glass panel therein.
Figure 3:
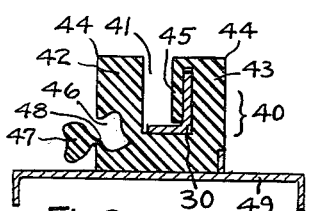
FIG. 3 is a similar cross sectional view of a reinforced elastomeric frame member of modified form, showing the same resting on a window sill cover of modified form.

The elastomeric frame member 40 shown in FIG. 3 is generally similar to the frame member 20 shown in FIGS. 1 and 2 but is architecturally different in appearance in that it is provided with square instead of rounded shoulders. Said frame member 40 has a longitudinally extending glass-receiving groove 41 and has two wing parts 42 and 43 provided with square shoulders 44 and has a flap 45 which extends into the groove 41 and forms one wall of said groove 41. The flap 45 cooperates in receiving and holding a reinforcing member 30 of L-shaped cross section and of a form hereinbefore shown and described in connection with FIG. 2. A longitudinally extending spline-receiving groove 46 is provided in the frame member 40 at the base of the wing member 42 and in offset relation to the glass-receiving groove 41. A filler strip or spline 47, shaped to fit the groove 46, is integrally connected along one edge by a hinge section 48 with the frame member 40 at the location of one edge of the groove 46. The spline 47 functions similarly to the spline 33 of FIG. 2. Usually the spline 47 is left out of the groove 46 until after the reinforcing member 30 has been inserted and the glass applied to a frame, after which the spline 47 is inserted and wedges the wing member 42 against the glass and the glass against the flap 45 of the reinforced wing member 43.

The elastomeric frame 40 is herein disclosed as resting on a sill cover 49 which differs from the sill cover 35 shown in FIG. 2. These sill covers are not part of the elastomeric frame strips. The frame 40 functions in substantially the same manner as the frame 20.

Figure 4:
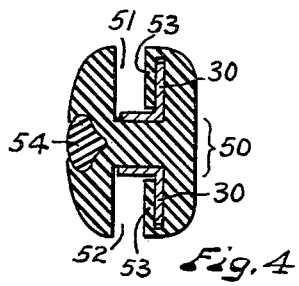
FIG. 4 is a cross sectional view of a reinforced elastomeric frame member or strip constructed to receive and hold two panels of non-flexible material, such as glass.

FIG. 4 shows an elastomeric frame member 50 of H shape in cross section and which is similar to the frame member 20 shown in FIGS. 1 and 2 except that it is of double or duplex construction and is adapted to receive and hold two panels of glass or other material. Said frame member 50 has two oppositely positioned glass-receiving grooves 51 and 52 each with an inwardly extending flap member 53 and a rigid reinforcing member 30. A spline 54 is insertable into and removable from a suitable groove in a side of the frame member 50. When the spline 54 is not in its groove the wing parts of the frame member 50 at one side of the glass-receiving grooves 51 and 52 can be swingingly moved outwardly to open up said grooves 51 and 52 for the insertion therein of reinforcing members 30 and panels of glass or other material to which the frame 50 is to be applied. The spline 54 operates similarly to spline 33 of FIG. 2 in providing sealing contact between the parts of frame 50 and two panels of glass. The reinforcing members 30 become permanent parts of the frame member 50 after they are installed and render said frame member stiff and resistant to bending and capable of functioning as a true frame in protecting a glass to which it is applied.

Figure 5:
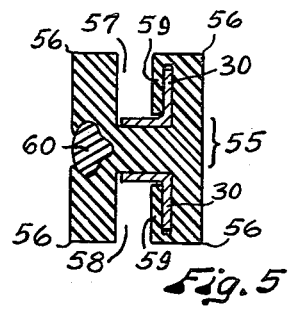
FIG. 5 is a cross sectional view of a reinforced elastomeric frame member similar to the one shown in FIG. 4 but of slightly modified shape.

The elastomeric frame member 55 shown in FIG. 5 is similar to the frame member 50 shown in FIG. 4 except that it is provided with square corners 56. Said frame member 55 has two oppositely positioned glass-receiving grooves 57 and 58 within each of which is an inwardly extending flap 59 and a reinforcing member 30. A spline 60 is provided in a suitable spline-receiving groove in a side of the frame member 55 offset relative to the glass-receiving grooves 57 and 58.

Figure 6:
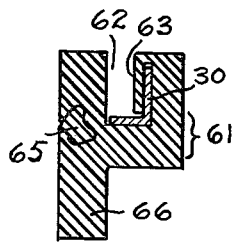
FIG. 6 is a cross sectional view of a reinforced elastomeric frame member made to hold a single pane or panel and modified to adapt it for use in a ventilator type window.

The elastomeric frame member 61 shown in FIG. 6 is of approximately Y shape in cross section and is a ventilator type frame capable of holding one panel of glass and of being movably mounted so that it can be swung open and closed. Said frame member 61 has a glass-receiving groove 62 within which is an inwardly extending flap 63 and a reinforcing member 30. A spline or filler strip 65, which can be integrally formed and similar to spline 47 of FIG. 3, is provided in a suitable groove in one side of the frame member 61. A sealing leg or stop flange 66 is provided on the side of the frame member 61 opposite to the groove 62. The corners of the frame member 61 are shown to be square but they may be rounded to match with other frame members having rounded corners.

Figure 7:
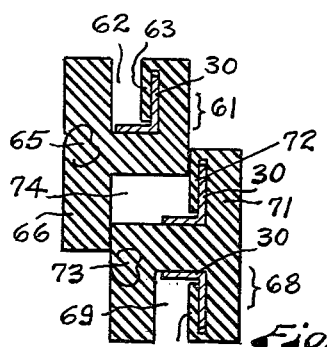
FIG. 7 is a cross sectional view of a reinforced elastomeric frame member the same as the one shown in FIG. 6 and illustrating its cooperation with another elastomeric frame member of somewhat similar form.

FIG. 7 shows the frame 61 of FIG. 6 in abutting relation against another elastomeric frame member 68 of approximately Y shape in cross section. Said frame 68 has a glass receiving groove 69 with inwardly extending flap 70 and reinforcing member 30. Said frame 68 also has a reinforced sealing and stop flange 71 protruding from the side thereof opposite the groove 69 and the inner side of the flange 71 is provided with an inwardly directed flap 72 which receives thereunder one flange of a reinforcing member 30. A spline 73 is provided at a suitable location in frame member 68. The two frames 61 and 68 contact each other in such a manner as to leave between them a space 74. In some instances suitable linkage which has to do with the support and moving and positioning of the frames 61 and 68 is disposed within this space 74.

Figure 8:
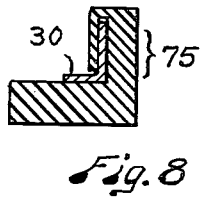
FIG. 8 is a cross sectional view of an L-shaped reinforced elastomeric frame member adapted to be used as a fixed frame or stop for cooperation with a single movable ventilator type frame member of the form shown in FIG. 6.

FIG. 8 shows an elastomeric frame member 75 of L-shaped cross section which has reinforcing 30 therein and can be used as a stop for the ventilator type frame 61 shown in FIG. 6. The frame 61 would contact the frame 75 in substantially the same manner as it does the frame 68 shown in FIG. 7.

Figure 9:
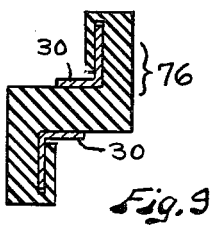
FIG. 9 is a view similar to FIG. 8 and showing a reinforced elastomeric frame member of Z-shape in cross section capable of being used as a fixed stop for two ventilator type frames of the form shown in FIGS. 6 and 7 and which are movable toward it from opposite directions.

FIG. 9 shows an elastomeric frame member 76 of approximately Z-shape in cross section and which has reinforcing members 30 therein. The frame 76 can be used as a stop for two ventilator type frames 61 of the form shown in FIGS. 6 and 7 in instances where they are movable toward the frame member 76 from opposite directions.

Figure 10:
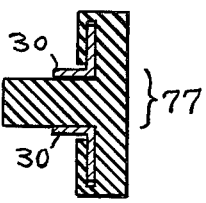
FIG. 10 is a view similar to FIGS. 8 and 9 showing a reinforced elastomeric frame member of T-shape in cross section capable of use as a stop frame for two ventilator type frames which are movable toward it from the same direction.

FIG. 10 shows a reinforced elastomeric frame strip 77 of approximately T-shape in cross section which can be used as a stop member for two of the ventilator type frames 61 in instances where said frames 61 are movable toward it in or from the same direction.

Figure 11:
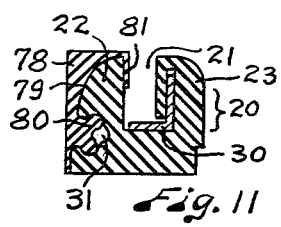
FIG. 11 is a cross sectional view of a plinth or adapter strip of elastomeric material showing the same applied to the frame member disclosed in FIGS. 1 and 2.

FIG. 11 shows a plinth or adapter member 78 of elastomeric material which can be used on a frame member that has rounded corners to square up the corners of said frame in the interest of architectural appearance or to make a frame having rounded corners match with a frame or frames having square corners. By way of illustration this plinth 78 is shown as applied to the frame member 20 of FIGS. 1 and 2. Said plinth 78 has an inside face 79 curved to fit the contour of the frame 20 and this curved inside face is provided with a longitudinally extending rib or spline 80 shaped and positioned to fit snugly within the groove 31. The spline 80 thus serves both as a fastening member for the plinth and as a filler strip for the groove 31. The top or outer edge of the plinth is provided with a relatively thin inwardly directed flap 81 which extends into the glass receiving groove 21 and serves as an anchor member for the outer edge portion of the plinth. The flap 81 will be firmly held when there is a glass in the groove 21. Obviously plinths of the general type disclosed in FIG. 11 but which are varied in shape to fit sealing strips of differing shapes can be provided.

Figure 12:
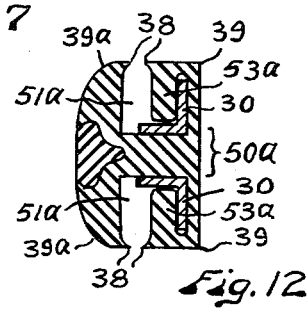
FIG. 12 is a cross sectional view of a modified form of the frame member shown in FIG. 4.

FIG. 12 shows a reinforced elastomeric frame member 50a of the general type shown in FIG. 4 but which has the reinforcing members 30 positioned differently therein to provide relatively thick flap members 53a which extend into the glass-receiving grooves 51a and are interposed between the reinforcing members 30 and the glass which may be within the grooves 51a. Also in FIG. 12 inwardly curved edge portions 38 are provided on the elastomeric parts on each side of the grooves 51a for better sealing engagement with the glass. Also in FIG. 12 the shoulders 39 of the elastomeric parts within which the reinforcing members 30 are disposed are square and the shoulders 39a of the parts at the other side of the member 50a are rounded.

Figure 13:
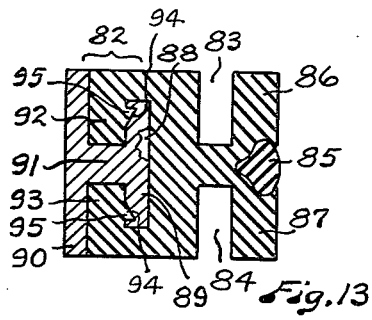
FIG. 13 is a cross sectional view of a reinforced elastomeric frame member shaped to receive two panels of glass or like material and having a reinforcing member of modified H-shape in cross section.
Figure 16:
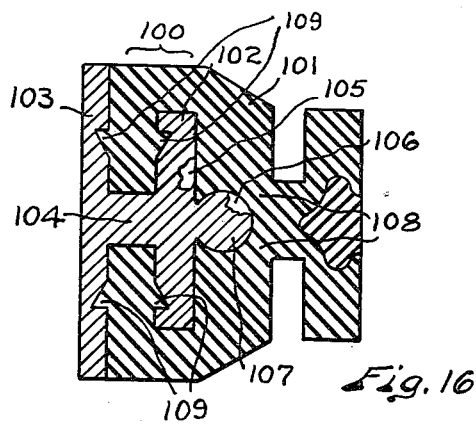
FIG. 16 is a cross sectional view of a heavy duty type modified form of reinforced elastomeric frame member generally similar to the frame member shown in FIG. 13.

FIG. 13 shows an elastomeric frame member 82 having reinforcing of a different type from that shown in FIGS. 1 to 12. Said frame member 82 has two longitudinally extending glass-receiving grooves 83 and 84 in opposite sides thereof. A spline 85 is provided in a suitable groove in a side of said frame member at right angles to the sides thereof in which the grooves 83 and 84 are formed. The spline 85 functions like the previously described splines in the structures of FIGS. 1 to 12. The part of the frame member 82 at the side of the grooves 83 and 84 opposite to the wing parts 86 and 87 is thicker than said wing parts and is provided with a groove 88 of T-shaped cross section. A reinforcing member of modified H-shape in cross section is disposed in the T-shaped groove 88 and is composed of a head flange 89 and a base flange 90 connected by a narrow medial web portion 91. The T-shaped groove 88 extends into the member 82 from a flat side thereof at right angles to the two glass receiving grooves 83 and 84 and said T-shaped groove 88 cooperates in forming two inwardly extending lip portions 92 and 93. These lip portions 92 and 93 extend between the head flange 89 and the base flange 90 of the H-shaped reinforcing member so that the base flange of the reinforcing member rests against a flat face of the elastomeric part of the member 82 and in effect forms one side of said member 82. To more securely bind the lip portions 92 and 93 between the flanges 89 and 90 of the reinforcing member I provide on at least one of the flanges, such as the head flange 89 and on the adjacent surfaces of the lip members 92 and 93 interfitting grooves 94 and ribs 95. These grooves and ribs can be provided on both of the flanges 89 and 90, as shown in FIG. 16 and hereinafter described, if desired.

The H-shaped reinforcing members 89, 90, 91 can be applied to the elastomeric part of the frame strip 82 after said strip has been extruded or molded and when so applied said reinforcing members become a permanent part of the frame members 82 and render said frame members 82 stiff and highly resistant to bending. Preferably the reinforcing members 89, 90, 91 are made from light metal, such as an aluminum alloy.

Figure 14:
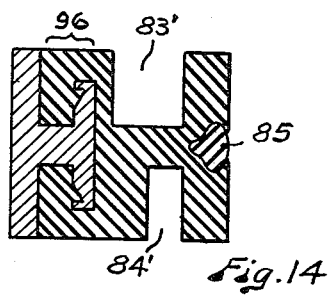
FIG. 14 is a cross sectional view showing a modification of the frame member disclosed in FIG. 13 and which has one narrow groove to receive a single panel of glass and one wide groove capable of receiving two panels of glass or a fairly thick panel of other material.

The reinforced elastomeric frame member 96 of FIG. 14 is similar to the frame member 82 of FIG. 13 except that one of the glass receiving grooves 83' thereof is substantially wider than the other groove 84', thus illustrating how one or both grooves can be made wide to receive a thick panel or to receive more than one sheet of glass.

Figure 15:
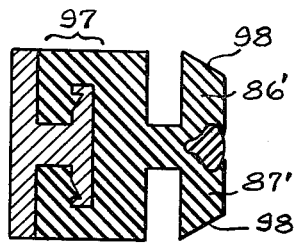
FIG. 15 is a cross sectional view showing another modification of the frame member illustrated in FIG. 13.

The frame member 97 shown in FIG. 15 is similar to the frame member 82 of FIG. 13 except that the wing members 86' and 87' thereof have beveled corners 98 providing a different architectural appearance, more clearance and better water deflecting qualities.

The elastomeric frame member 100 shown in FIG. 16 is generally similar to the frame member 82 of FIG. 13 but is designed for use with larger and heavier panels of glass or other material. Because of the increased size of the reinforced elastomeric part of this frame member 100 it becomes more difficult to get an H-shaped reinforcing member formed of a head flange 102, a base flange 103 and a web part 104 into a T-shaped groove 105 in said elastomeric part 101. This installation difficulty is minimized by providing in the part 101 a medially disposed extension groove 106 which is connected with groove 105 and extends toward the base of the glass-receiving grooves in frame member 100 and is suitably shaped and dimensioned to receive an integral rib 107 of approximately cylindrical cross section on the reinforcing member head flange 102. The provision of the extension groove 106 reduces the thickness of elastomeric material at the locations 108 so that the two side portions of the part 101 can be more easily spread apart and manipulated in engaging them with the reinforcing member. The reinforcing member head flange 102 and base flange 103 both have longitudinally extending grooves on the inner sides thereof to receive ribs 109 of elastomeric material which are provided on the adjacent surfaces of the part 101 of frame member 100. This binds the elastomeric and reinforcing parts of frame member 100 very firmly together.

Figure 17:
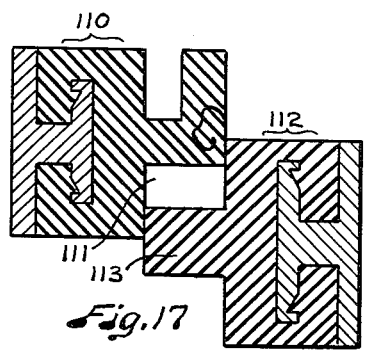
FIG. 17 is a cross sectional view showing a stop member in operative relation to and limiting movement in one direction of a ventilator type frame member which has reinforcing of the form shown in FIG. 13.

The elastomeric frame member 110 shown uppermost in FIG. 17 is generally similar to the frame member 82 shown in FIG. 13 but is modified to the extent that a wing part which cooperates in forming one glass-receiving groove is omitted. This leaves a longitudinally extending notch 111 in the corner portion from which the wing part is omitted and adapts said frame member 110 for use on windows of ventilator type. A reinforced elastomeric stop and sealing member 112 is also shown in FIG. 17 and the frame member 110 abuts and seals against the member 112. Said member 112 has a longitudinally extending flange 113 against which a shoulder of the frame member 110 can abut and seal. Two of the frame members 110, if they are mounted for movement in the same direction, can abut and seal against one stop member 112. Also two of said frame members 110 can cooperate in abutting and sealing against each other in the same manner as do the frame members 61 and 68 illustrated in FIG. 7.

Figure 18:
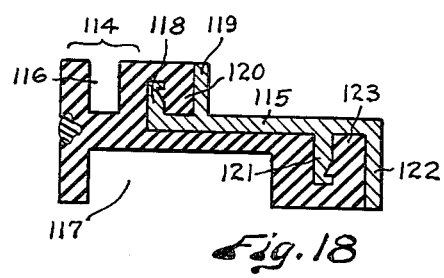
FIG. 18 is a cross sectional view of an elastomeric frame member having still another type of reinforcing therein.

The elastomeric frame member shown in FIG. 18 is provided with a reinforcing member 115 of modified type. This frame member 114 has a narrow glass-receiving groove 116 on one side and has a wide groove 117 on the other side. The wide groove 117 is capable of receiving a relatively thick panel, such as a panel of structural material or insulation. The edge of the reinforcing member 115 adjacent the glass receiving groove 116 has two transversely extending spaced apart parallel flanges 118 and 119 which receive therebetween a wing 120 of the elastomeric material thus securely attaching this edge of the reinforcing member 115 and the elastomeric material together. The other edge of the reinforcing member 115 has two spaced apart parallel transverse flanges 121 and 122 which extend in the opposite direction from the flanges 118 and 119 and receive therebetween and securely hold an edge wing part 123 of elastomeric material. Thus the reinforcing member 115 is securely engaged with the elastomeric material at both edges and becomes a permanent part of the frame member 114.

The foregoing description and accompanying drawings clearly disclose preferred forms of my invention but it will be understood that these disclosures are merely illustrative and that changes may be made within the scope of the following claims.

I claim:

1. A bend resistant frame member for application to a flat panel comprising a strip of elastomeric material having a longitudinally extending panel-receiving groove therein; an inwardly extending flap forming one side of said panel-receiving groove, the outer edge of said flap being integrally connected with said strip and the inner side of said flap being spaced from an adjacent wall of said strip and the inner edge of said flap being spaced from the bottom of said panel-receiving groove; a longitudinally extending metal reinforcing member of L-shaped cross section embodied in and forming part of said strip, one flange of said reinforcing member being disposed under said flap and lying alongside of said panel-receiving groove and the other flange thereof resting on the bottom of said panel-receiving groove; a longitudinally extending spline-receiving groove in a side of said strip opposite to the side thereof with which said flap is connected; and a spline insertable in and removable from said spline-receiving groove.

2. A bend resistant frame member for glass panels comprising a strip of elastomeric material having two longitudinally extending panel-receiving grooves in opposite sides thereof adapted to fit over and receive edge portions of panels with the panels disposed substantially in a common plane; two longitudinally extending metal reinforcing members of L-shaped cross section embodied in and forming part of said strip of elastomeric material, one flange of each reinforcing member resting on the bottom of one of the panel-receiving grooves and the other flange thereof being embedded in the strip and lying alongside of the panel-receiving groove; a longitudinally extending spline-receiving groove offset transversely relative to said panel-receiving grooves and extending from a side of said strip into said strip toward the bottoms of said panel-receiving grooves; and a spline of elastomeric material insertable into and removable from said spline-receiving groove.

3. A bend resistant frame member for application to a flat panel comprising a strip of elastomeric material having a longitudinally extending panel-receiving groove therein; an inwardly extending flap forming one side of said panel-receiving groove, the outer edge of said flap being integrally connected with said strip and the inner face of said flap being spaced from an adjacent face of said strip and the inner edge of said flap being spaced from the bottom of said panel-receiving groove; a longitudinally extending reinforcing member of L-shaped cross section embodied in and forming part of said strip, one flange of said L-shaped reinforcing member being disposed under said flap and lying alongside of said panel-receiving groove and the other flange thereof resting on the bottom of said panel receiving groove; a longitudinally extending spline-receiving groove in a side of said strip opposite to the side thereof with which said flap is connected; a spline insertable in and removable from said spline-receiving groove; and a longitudinally extending integral flange of less width than said elastomeric strip protruding from a side of said strip opposite to said panel receiving groove and flush with the side of the strip in which the spline-receiving groove is disposed, said flange serving as a stop and seal member.

References Cited in the file of this patent

UNITED STATES PATENTS

| | | |
|---|---|---|
| 1,961,352 | Hall | June 5, 1934 |
| 2,609,071 | Morgann et al. | Sept. 2, 1952 |
| 2,683,905 | Beck | July 20, 1954 |
| 2,746,103 | Bright | May 22, 1956 |
| 2,984,875 | Herr et al. | May 23, 1961 |